(12) United States Patent
Schieder et al.

(10) Patent No.: US 11,577,669 B2
(45) Date of Patent: Feb. 14, 2023

(54) VEHICLE SHELL ASSEMBLY

(71) Applicant: Webasto SE, Stockdorf (DE)

(72) Inventors: Bernhard Schieder, Stockdorf (DE);
Roman Raschke, Stockdorf (DE);
Alexander Kilias, Stockdorf (DE);
Bernd Veihelmann, Landshut (DE);
Philipp Engelhardt, Landshut (DE);
Andreas Knödler-Bunte, Munich (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 17/422,675

(22) PCT Filed: Feb. 7, 2020

(86) PCT No.: PCT/EP2020/053113
§ 371 (c)(1),
(2) Date: Jul. 13, 2021

(87) PCT Pub. No.: WO2020/161291
PCT Pub. Date: Aug. 13, 2020

(65) Prior Publication Data
US 2022/0118920 A1    Apr. 21, 2022

(30) Foreign Application Priority Data
Feb. 8, 2019    (DE) .................. 10 2019 103 172.9

(51) Int. Cl.
*B60R 13/04*    (2006.01)
(52) U.S. Cl.
CPC .................. *B60R 13/04* (2013.01)

(58) Field of Classification Search
CPC .................. B60Q 3/54; B60Q 1/26
See application file for complete search history.

(56) References Cited

U.S. PATENT DOCUMENTS

| 3,694,945 A | 10/1972 | Detiker |
| 7,985,008 B2 | 7/2011 | Kaisser et al. |
(Continued)

FOREIGN PATENT DOCUMENTS

| DE | 102007013078 A1 | 9/2008 |
| DE | 102010002282 A1 | 8/2011 |
(Continued)

OTHER PUBLICATIONS

International Search Report for PCT/EP2020/053113 dated Jun. 26, 2020 in English and German (5 pages).
(Continued)

*Primary Examiner* — Andrew J Coughlin
(74) *Attorney, Agent, or Firm* — Fitch, Even, Tabin & Flannery, LLP

(57) ABSTRACT

A vehicle shell assembly, having a plate-like plastic body having an outside and an inside. A lighting unit is provided which is disposed on the inside and is configured to be switched between an active state and a passive state; the inside of the plastic body is provided with an opaque light-impermeable coating which has at least one gap; and the plastic body may have of a translucent material so that the gap is covered by the plastic body to the outside when the lighting unit is in the passive state and defines a light pattern which is visible from the outside when the lighting unit is in the active state.

13 Claims, 3 Drawing Sheets

(56) References Cited

U.S. PATENT DOCUMENTS

| | | | | |
|---|---|---|---|---|
| 10,293,761 B2 * | 5/2019 | Topart | ...................... | B60Q 3/54 |
| 10,520,159 B1 * | 12/2019 | Tsai | ........................ | F21S 43/33 |
| 2008/0253140 A1 * | 10/2008 | Fleischmann | ............ | B60Q 1/50 |
| | | | | 29/832 |
| 2009/0257241 A1 * | 10/2009 | Meinke | ................. | B60R 13/005 |
| | | | | 362/546 |
| 2012/0257376 A1 * | 10/2012 | Zhou | ....................... | G02B 5/045 |
| | | | | 362/97.1 |
| 2013/0061679 A1 | 3/2013 | Steckel | | |
| 2014/0119038 A1 | 5/2014 | Mulder et al. | | |
| 2014/0133128 A1 * | 5/2014 | Oh | ........................ | G02B 6/0038 |
| | | | | 362/97.1 |
| 2014/0247614 A1 * | 9/2014 | Roberts | ................ | B60Q 1/2615 |
| | | | | 362/509 |
| 2015/0291085 A1 | 10/2015 | Manning | | |
| 2015/0307033 A1 * | 10/2015 | Preisler | .................... | B60Q 3/20 |
| | | | | 296/1.08 |

FOREIGN PATENT DOCUMENTS

| | | | | |
|---|---|---|---|---|
| EP | 1772667 | A2 | 4/2007 | |
| EP | 1344688 | B1 | 11/2012 | |
| GB | 2517736 | A * | 3/2015 | ........... B60Q 1/0035 |
| GB | 2552996 | A | 2/2018 | |
| JP | 2010100099 | A | 5/2010 | |

OTHER PUBLICATIONS

International Search Report for PCT/EP2020/053113 dated Aug. 19, 2021 (10 pages).

* cited by examiner

VEHICLE SHELL ASSEMBLY

CROSS-REFERENCE TO RELATED APPLICATIONS

This application is a U.S. national phase application filed under 35 U.S.C. § 371 of International Application No. PCT/EP2020/053113, filed 7 Feb. 2020, designating the United States, which claims priority from German Patent Application No. 10 2019 103 172.9, filed 8 Feb. 2019, which are hereby incorporated herein by reference in their entirety for all purposes.

FIELD

The invention relates to a vehicle shell assembly having the features of the preamble of claim 1.

BACKGROUND

A vehicle shell assembly of this kind is known from practice and in particular constitutes a paneling element which is disposed in the region of the front or rear of a vehicle. The known vehicle shell assembly comprises a plate-like plastic body whose outside forms a visible surface and whose inside faces the vehicle interior. The plate-like plastic body forms a closed surface which is opaque and has a black and shining outside of high quality. This plastic body thus creates a so-called "black-panel look".

SUMMARY

The object of the invention is to provide a vehicle shell assembly which is realized in accordance with the generic type mentioned in the introduction and whose optical appearance is variable.

In accordance with the invention, this object is attained by the vehicle shell assembly having the features of claim 1.

In accordance with the invention, a vehicle shell assembly is thus provided which comprises a plate-like plastic body having an inside and an outside. A lighting unit is provided which is disposed on the inside, i.e., on the side of the plastic body facing away from the outside, and which is configured to be switched between an active state and a passive state. In the active state, the lighting unit is illuminated. In the passive state, the lighting unit does not emit any light. The inside of the plastic body is provided with an opaque light-impermeable coating which has at least one gap. Besides, the plastic body consists of a translucent material so that the gap is covered by the plastic body to the outside when the lighting unit is in the passive state and determines a light pattern which is visible from the outside or the vehicle surroundings when the lighting unit is in the active state.

The vehicle shell assembly according to the invention is accordingly characterized in that the material of the plastic body is selected to conceal the coating having the at least one gap when the lighting unit is in the passive state. This is achieved by choosing a suitable translucent or sufficiently dyed plastic material. In the active state of the lighting unit, in which said lighting unit emits light in the direction of the opaque coating or of the plate-like plastic body, a light pattern can however be seen from the vehicle surroundings, said light pattern being defined by the opaque coating having the at least one gap which passes the light of the lighting unit. The coating thus forms a masking of the inside of the plastic body and determines the light pattern by the shape and the number of gaps.

The vehicle shell assembly according to the invention can be integrated on the outside of the vehicle in a variety of ways. For example, the vehicle shell assembly forms a panel element which forms a visible surface in the region of a front or rear bumper of a vehicle. The vehicle shell assembly according to the invention can also be disposed between two ribs which are realized in the region of a bumper. In this case, the plate-like plastic body can be manufactured in one piece with the ribs. It is, however, also conceivable that the vehicle shell assembly according to the invention is integrated in the region of a rear spoiler or in the region of a trunk lid next to lighting units of the relevant vehicle.

The term "plate-like" is to be understood in its broadest sense, i.e., the plastic body can be a flat, planar or curved element having a smooth or also a structured outside. It is also conceivable that the plate-like plastic body merges into ribs or other vehicle structures, filling a space between the ribs or the other vehicle structures.

In order to promote a three-dimensional light effect or a depth effect of the light effect, the inside of the plastic body has a recess in the region of the gap of the coating.

The recess has boundary surfaces which are preferably inclined with respect to each other. This means that an angle which can in particular determine a sharp-edged structure is realized between the boundary surfaces. The boundary surfaces are separated from each other by a sharp dividing line in this case. For example, the recess has the shape of a pyramid or the like.

The reduced material thickness of the plastic body in the region of the recess results in a depth effect when the lighting unit is in the active state, said depth effect having a light intensity which in particular changes over the surface, preferably within a sharp-edged pattern. When the lighting unit is switched off, i.e., in its passive state, the sharp-edged pattern cannot be seen.

In an exemplary embodiment, the plastic body can have a basic material thickness of approximately 4 mm to 6 mm. In the region of the recess, the plastic body can have a reduced material thickness of approximately 1.0 to 3.5 mm, for instance. Lower material thicknesses are also conceivable as a matter of course.

In a special embodiment of the vehicle shell assembly according to the invention, the coating is formed from a film, a coat of varnish or a printed image.

As an alternative, it is conceivable that the plastic body and the coating form a two-component injection-molded part and that the plastic body is formed from a first material component of the two-component injection-molded part which is translucent and the coating is formed from a second material component of the two-component injection-molded part which is opaque.

The coating can have basically any color. It only has to be guaranteed that the coating does not let any light emitted by the lighting unit pass. In particular, the coating can, however, be black, which promotes a so-called "black-panel look".

The plastic body, which consists of the translucent material, is produced from a polycarbonate material in a special embodiment of the vehicle shell assembly according to the invention. Said polycarbonate material in particular has an outside which is formed by a highly polished surface of high quality. A piano black look arises from dying the polycarbonate material black and from a black coating.

In an alternative embodiment of the vehicle shell assembly according to the invention, the plastic body is produced from a polyurethane material having translucent properties.

In order to make the vehicle shell assembly according to the invention wear-resistant, it is advantageous if the outside of the plastic body is provided with a scratch-resistant coating. This can consist of a coat of varnish or also of a protective film.

The plate-like plastic body, which is provided with the opaque coating, is preferably backlit over its entire surface and in a uniform way. In order to achieve this, the lighting unit, which can comprises an LED light source or also another kind of light source, a diffusor plate which distributes the light emitted by the light source evenly over the surface.

To prevent light from escaping laterally, the lighting unit can have a housing which rests against the opaque coating in a light-proof way. This guarantees that the light emitted by the light source of the lighting unit is only emitted in the direction of the opaque coating or only in the direction of the plate-like plastic body.

In an expedient embodiment of the vehicle shell assembly according to the invention, the luminous intensity lighting unit and/or luminous color of the lighting unit are adjustable. In this way, particular customer requirements can be fulfilled and effects, such as a welcome effect, might be created.

Other advantages and advantageous embodiments of the subject-matter of the invention are apparent from the description, the drawing and the claims.

BRIEF DESCRIPTIONS OF THE DRAWINGS

An exemplary embodiment of a vehicle shell assembly according to the invention is illustrated in a schematically simplified manner in the drawing and will be explained in more detail in the following description.

DETAILED DESCRIPTION

Figure 1:
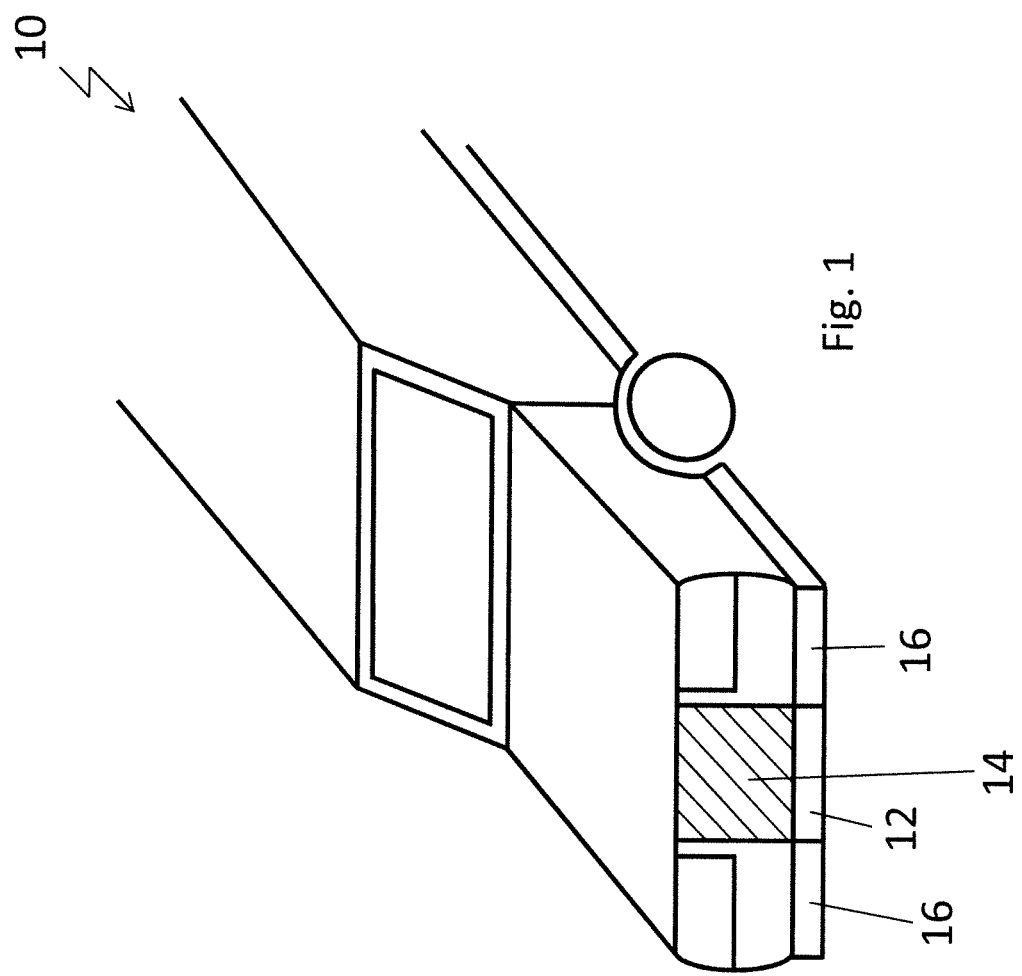
FIG. 1 shows a perspective front view of a motor vehicle having a vehicle shell assembly according to the invention.

The drawing illustrates a motor vehicle 10 which is realized as a passenger vehicle and which has a bumper assembly 12 extending in the transverse direction of the vehicle on the front of the vehicle. The bumper assembly 12 is disposed below a radiator grille 14.

The bumper assembly 12 is realized as a vehicle shell assembly 16 in its end regions which are disposed on each side of a vertical longitudinal center plane of the vehicle, said vehicle shell assembly 16 providing an additional design element of the motor vehicle 10 which can be illuminated on demand.

Figure 2:
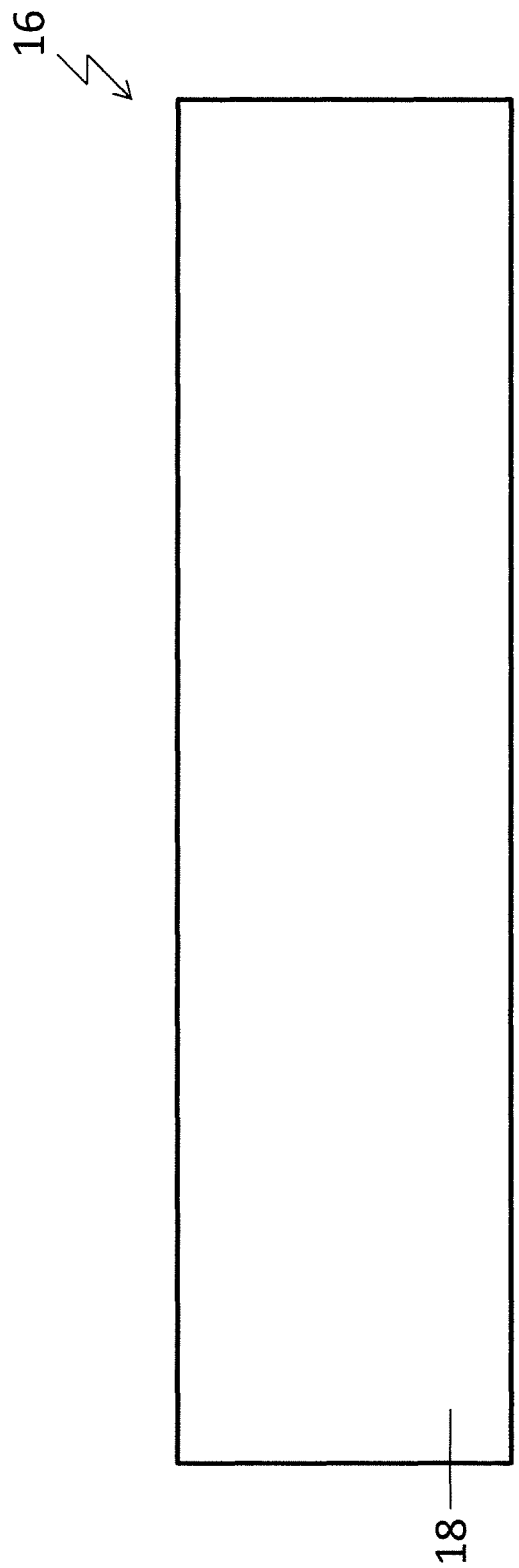
FIG. 2 shows a top view of the vehicle shell assembly in the deactivated state of a lighting unit of said vehicle shell assembly.
Figure 3:
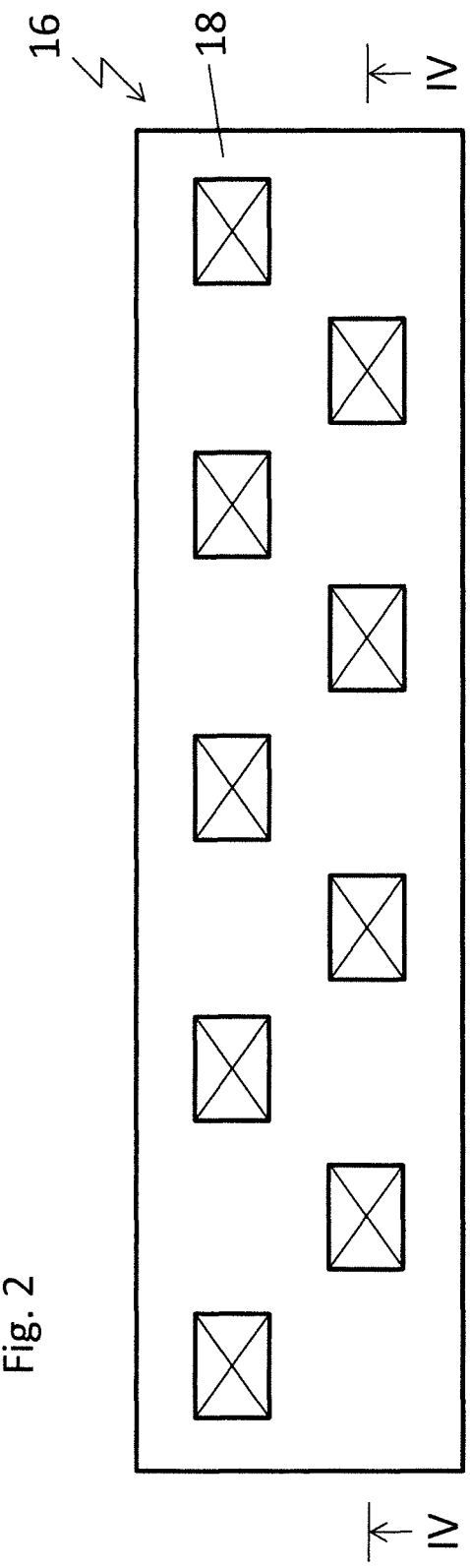
FIG. 3 shows a top view of the vehicle shell assembly in the activated state of the lighting unit.
Figure 4:
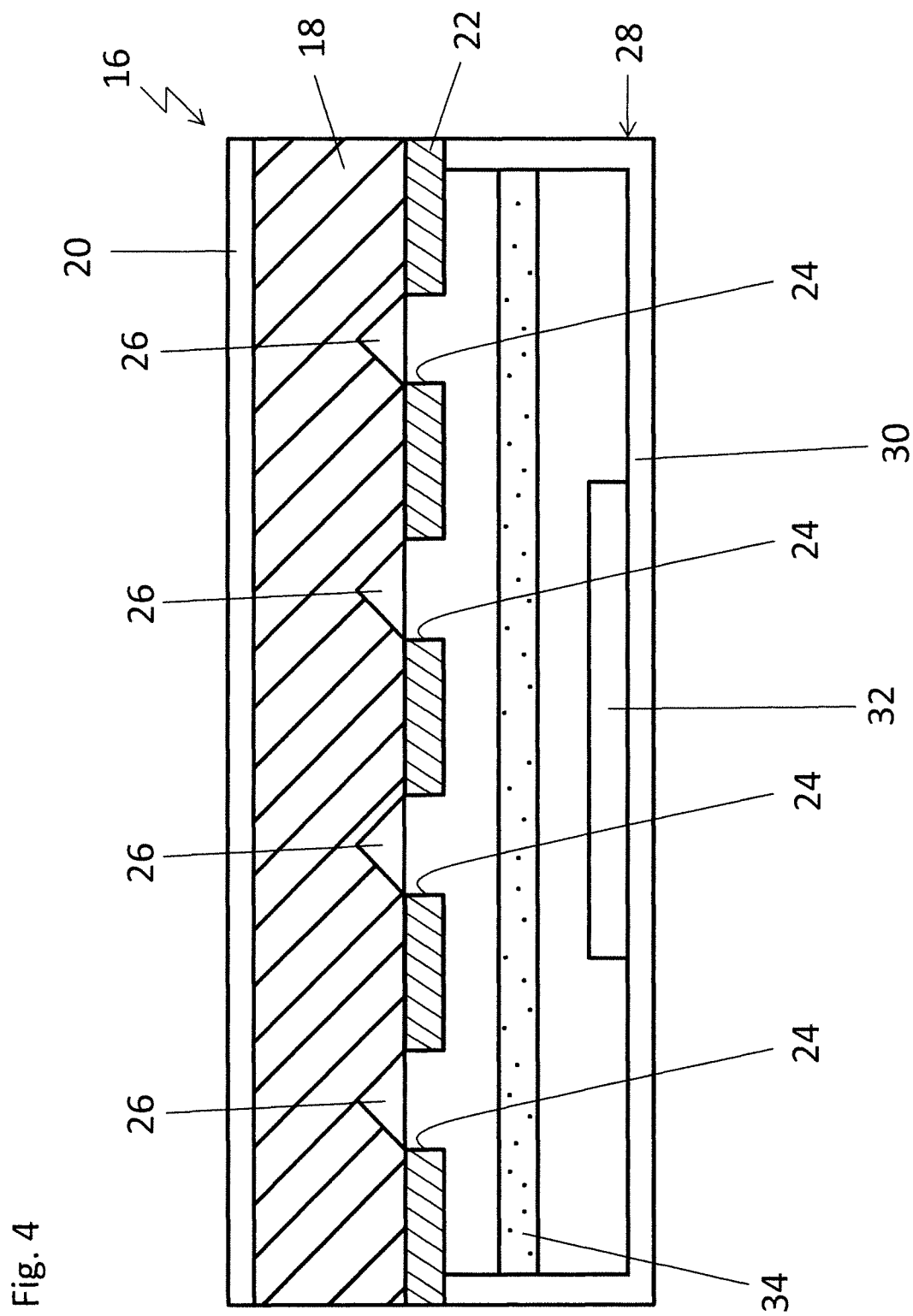
FIG. 4 shows a section through the vehicle shell assembly according to FIG. 2 along line IV-IV in FIG. 2.

As FIGS. 2 and 3 show, the vehicle shell assemblies 16 each comprise a plate-like plastic body 18 which is produced from a translucent black polycarbonate material. The plastic body 18 has an outside which is provided with a scratch-resistant paint 20.

On the inside which faces away from the scratch-resistant coating 20, the plastic body 18 is provided with a coating 22 which consists of a black polycarbonate film and is realized in an opaque or light-impermeable way. The coating 22 has a plurality of gaps 24 which each have a rectangular outline in the present application. The coating 22 thus forms a masking of the plastic body 18 on the inside.

The inside of the plate-like plastic body 18 has a pyramid-like recess 26 in the region of each gap 24 so that the material thickness of the plastic body 18 is reduced in the region of the gaps 24 in contrast to a basic material thickness. The pyramid surfaces of the recesses 26 are each divided from each other by sharp dividing lines, i.e., by the edges of the pyramid which is spanned by surfaces. For example, the plastic body 18 has a basic material thickness of 5 mm whereas the reduced material thickness amounts to approximately 3.5 mm in the region of the gaps 24 or of the vertex of the recesses 26.

Furthermore, the vehicle shell assemblies 16 each have a lighting unit 28 with which it is possible to backlight the unit consisting of the plastic body 18 and the coating 22 over its entire surface. The lighting unit 28 comprises a housing 30 which rests against the coating 22 with its rims so that is does not let any light pass and which receives a light source 32 formed from at least one LED. A diffusor layer 34 is moreover disposed between the light source 32 and the coating 22, said diffusor layer 34 bringing about a light output when the light source 32 is activated, said light output appearing homogeneous over the surface of the lighting unit 28.

The plastic material of the plastic body 18 is dyed in such a manner that the vehicle shell assembly appears to be homogeneous and completely black from the outside when the light source 32 is deactivated. The pattern realized by the coating 22 and the gaps 24 realized therein and the recesses 26 cannot be seen (FIG. 2). If, however, the light source 32 is switched to an active state, emitting light in the direction of the coating 22, light shines through the gaps 24 so that the light shines through the plastic body 24 via the recesses 26 and that the light pattern illustrated in FIG. 3 can be seen from the surroundings of the vehicle, said light pattern being defined by the shape of the gaps 24 and the shape of the recesses 26.

LIST OF REFERENCE NUMERALS 10 motor vehicle
12 bumper assembly
14 radiator grille
16 vehicle shell assembly
18 plastic body
20 scratch-resistant coating
22 coating
24 gap
26 recess
28 lighting unit
30 housing
32 light source
34 diffusor layer

The invention claimed is:

1. A vehicle shell assembly, comprising:
a plate-like plastic body having an outside and an inside, wherein a lighting unit is disposed on the inside and is configured to be switched between an active state and a passive state, in that the inside of the plastic body is provided with an opaque light-impermeable coating which has at least two gaps, and in that
the plastic body consists of a translucent material so that the at least two gaps are covered by the plastic body to the outside when the lighting unit is in the passive state and defines a light pattern which is visible from the outside when the lighting unit is in the active state; and further comprising recessed areas extending into the plastic body in each region of the at least two gaps of the coating.

2. The vehicle shell assembly according to claim 1, wherein said recessed areas having boundary surfaces which are inclined with respect to each other, and which are separated from each other by a sharp dividing line.

3. The vehicle shell assembly according to claim 2, wherein the plastic body has a basic material thickness of approximately 4 mm to 6 mm and a reduced material thickness of approximately 1.0 to 3.5 mm in the region of the recess.

4. The vehicle shell assembly according to claim 2, wherein the recessed areas are pyramid-like.

5. The vehicle shell assembly according to claim 4, wherein the pyramid-like recesses have surfaces separated from each other by a pyramid vertex.

6. The vehicle shell assembly according to claim 1, wherein the coating is formed from a film, a coat of varnish or a printed image.

7. The vehicle shell assembly according to claim 1, wherein the plastic body and the coating form a two-component injection-molded part and in that the plastic body is formed from a first material component and the coating is formed from a second material component of the two-component injection-molded part.

8. The vehicle shell assembly according to claim 1, wherein the plastic body is produced from a polycarbonate material.

9. The vehicle shell assembly according to claim 1, wherein the outside of the plastic body is provided with a scratch-resistant coating.

10. The vehicle shell assembly according to claim 1, wherein the lighting unit comprises a diffusor plate.

11. The vehicle shell assembly according to claim 1, wherein the lighting unit has a housing which rests against the opaque coating in such a way that it does not let any light pass.

12. The vehicle shell assembly according to claim 1, wherein the luminous intensity and/or luminous color of the lighting unit is adjustable.

13. The vehicle shell assembly according to claim 1, wherein the recessed areas are configured to promote a three-dimensional light pattern or a depth effect of the light effect.

* * * * *